(12) United States Patent
Mirkazemi-Moud et al.

(10) Patent No.: US 7,878,397 B2
(45) Date of Patent: Feb. 1, 2011

(54) ENHANCED SECURITY MAGNETIC CARD READER ESPECIALLY USEFUL IN POINT OF SALE DEVICES

(75) Inventors: Mehran Mirkazemi-Moud, Rocklin, CA (US); Jack Richard Grenfell, Rocklin, CA (US); Arnon Aviv, Herzlía (IL)

(73) Assignee: Verifone, Inc., San Jose, CA (US)

( * ) Notice: Subject to any disclaimer, the term of this patent is extended or adjusted under 35 U.S.C. 154(b) by 458 days.

(21) Appl. No.: 11/940,978

(22) Filed: Nov. 15, 2007

(65) Prior Publication Data

US 2009/0127336 A1    May 21, 2009

(51) Int. Cl.
*G06K 7/08* (2006.01)

(52) U.S. Cl. ..................... 235/449; 235/380; 235/451; 235/492

(58) Field of Classification Search ................ 235/449, 235/451, 441, 440, 439, 492
See application file for complete search history.

(56) References Cited

U.S. PATENT DOCUMENTS

| 5,861,662 | A | 1/1999 | Candelore |
| 5,998,858 | A | 12/1999 | Little et al. |
| 6,646,565 | B1 | 11/2003 | Fu et al. |
| 6,830,182 | B2 | 12/2004 | Izuyama et al. |
| 6,853,093 | B2 | 2/2005 | Cohen et al. |
| 6,917,299 | B2 | 7/2005 | Fu et al. |
| 2005/0218227 | A1* | 10/2005 | Takita et al. ................. 235/441 |
| 2006/0049255 | A1 | 3/2006 | von Mueller et al. |

FOREIGN PATENT DOCUMENTS

| JP | 2002108711 | 4/2002 |
| WO | 2005086546 | 9/2005 |

* cited by examiner

*Primary Examiner*—Edwyn Labaze
(74) *Attorney, Agent, or Firm*—Fish & Richardson P.C.

(57) ABSTRACT

A magnetic card reader including a magnetic head, located in a non-secured region, at least one signal path including at least first and second electrical conductors extending from the magnetic head in the non-secured region to a secured region, circuitry located within the secured region and receiving at least one signal output along at least one signal path, the circuitry located within the secured region including functionality ensuring that a voltage difference along the at least first and second electrical conductors is virtually zero, thereby obviating illicit information retrieval via tapping of the at least first and second conductors and analysis of voltage differences therebetween.

18 Claims, 6 Drawing Sheets

ENHANCED SECURITY MAGNETIC CARD READER ESPECIALLY USEFUL IN POINT OF SALE DEVICES

FIELD OF THE INVENTION

The present invention relates to magnetic card readers generally.

BACKGROUND OF THE INVENTION

The following patent documents are believed to represent the current state of the art:
 Japanese Patent JP 2002108711;
 U.S. Pat. Nos. 6,830,182; 6,853,093 5,998,858, 5,861,662 and 6,917,299;
 Published PCT Application WO 2005/086546; and
 U.S. Published Patent Application 2006/0049255.

SUMMARY OF THE INVENTION

The present invention seeks to provide a magnetic card reader having enhanced security.

There is thus provided in accordance with a preferred embodiment of the present invention a magnetic card reader including a magnetic head having at least one signal output, the magnetic head being located in a non-secured region, at least one signal path including at least first and second electrical conductors extending from the magnetic head in the non-secured region to a secured region and carrying the at least one signal output and circuitry located within the secured region and receiving the at least one signal output along the at least one signal path, the circuitry located within the secured region including functionality ensuring that a voltage difference along the at least first and second electrical conductors is virtually zero, thereby obviating illicit information retrieval via tapping of the at least first and second conductors and analysis of voltage differences there between.

There is also provided in accordance with another preferred embodiment of the present invention a point-of-sale device including a housing, a magnetic card reader associated with the housing, the magnetic card reader including a magnetic head having at least one signal output, the magnetic head being located in a non-secured region and at least one signal path extending from the magnetic head in the non-secured region to a secured region and carrying the at least one signal output and circuitry located within the secured region and receiving the at least one signal output along the at least one signal path, the circuitry located within the secured region including functionality ensuring that a voltage difference along the at least first and second electrical conductors is virtually zero, thereby obviating illicit information retrieval via tapping of the at least first and second conductors and analysis of voltage differences there between.

Preferably, the circuitry located within the secured region includes an operational amplifier having at least negative and positive inputs respectively connected to the at least first and second electrical conductors. Additionally, the circuitry located within the secured region also includes a resistor connected between the negative input and an output of the operational amplifier.

Preferably, resistance of the resistor connected between the negative input and an output of the operational amplifier is selected such that an output signal of the operational amplifier has a voltage which is equal to or less than the maximum voltage employed to power the operational amplifier. Additionally, the resistance of the resistor is operative to reduce the effect of an increase in the output voltage from the operational amplifier as a result of an increase in the swipe speed of a magnetic card relative to the magnetic head.

Preferably, the point-of-sale device or the magnetic card reader also includes an impedance sensor coupled to the at least one signal path at a location within the secured region. Additionally, point-of-sale device or the magnetic card reader also includes an impedance change indicator and the impedance sensor provides an output indication to the impedance change indicator when a resistance or other impedance is coupled to the at least one signal path in an unauthorized manner.

Preferably, the magnetic head includes a mounting element, at least one information reading sensor having output contacts, the sensor being mounted in the mounting element and a flat cable coupled to the output contacts of the at least one information reading sensor, a portion of the flat cable being arranged in a doubled-over configuration over the output contacts, thereby to provide anti-tampering protection to the output contacts. Additionally, the mounting element defines a peripheral anti-tampering enclosure and the at least one information reading sensor and the portion of the flat cable arranged in a doubled-over configuration are located within the peripheral anti-tampering enclosure.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
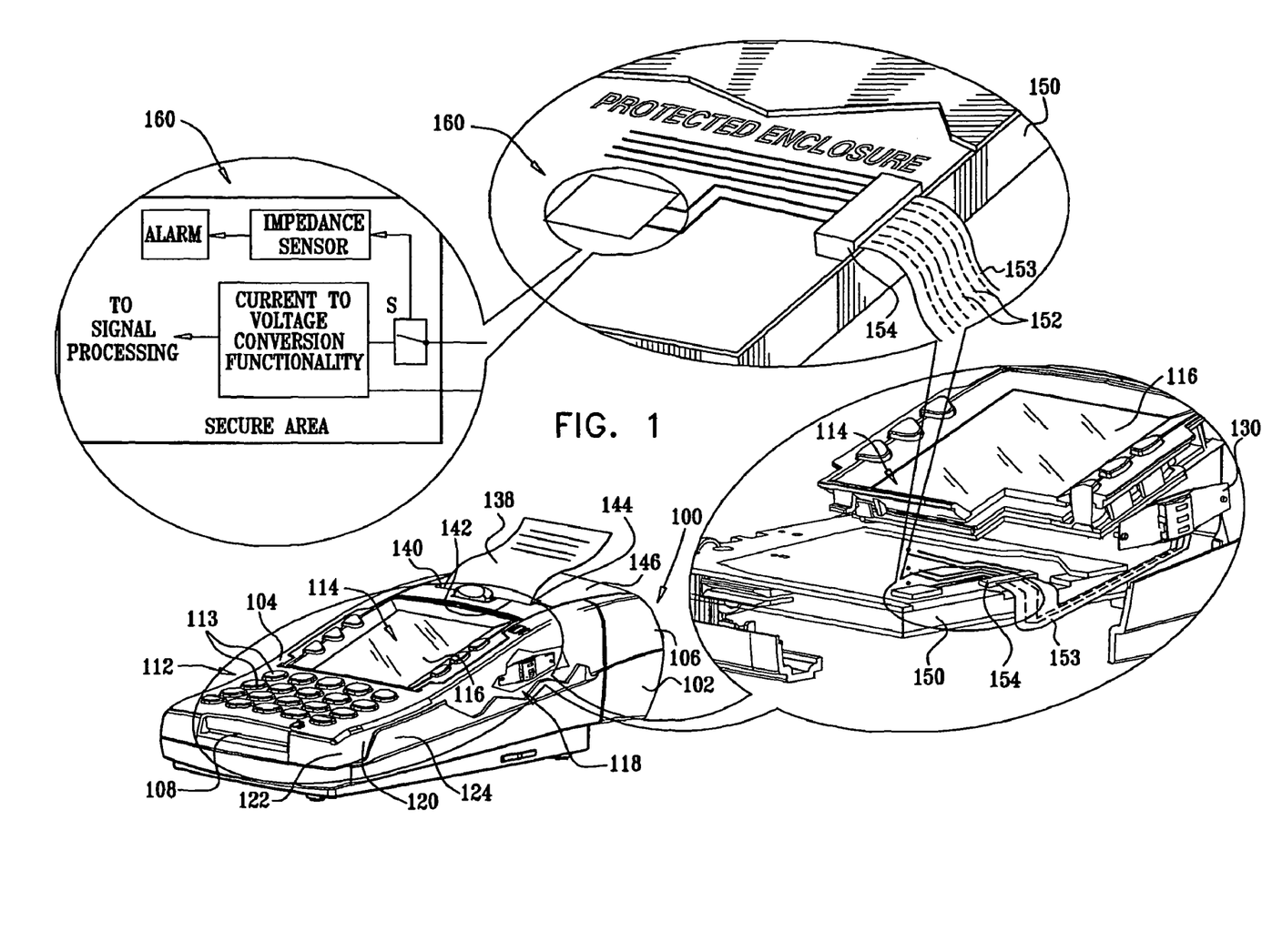
FIG. 1 is a simplified partially schematic, partially block diagram illustration of a point of sale terminal including magnetic card reader functionality incorporating a preferred embodiment of the present invention.
Figure 2:
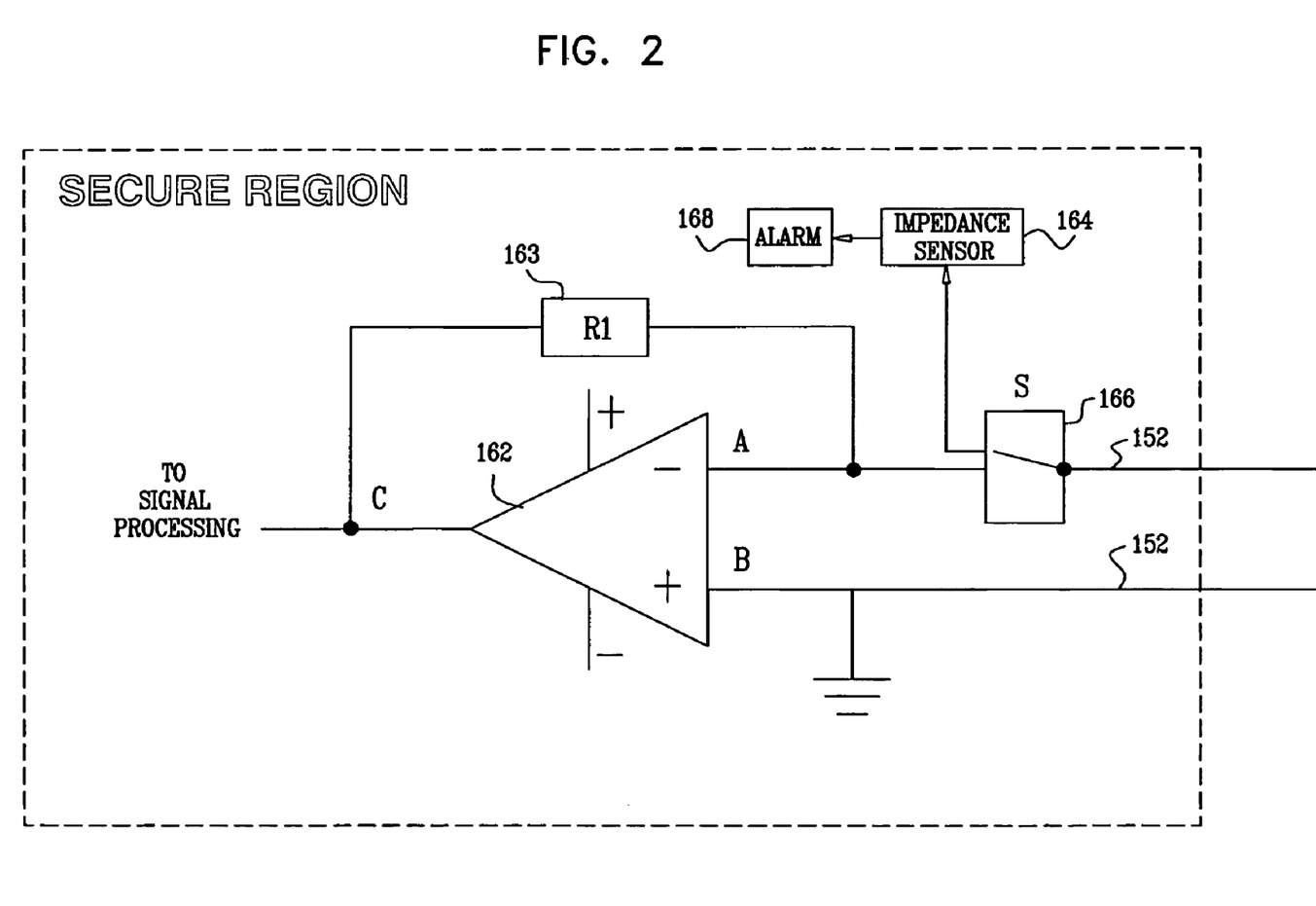
FIG. 2 is a simplified electrical schematic illustration of an embodiment of circuitry useful in the embodiment of FIG. 1.

Reference is now made to FIGS. 1 & 2, which illustrate a point of sale terminal including a card reader constructed and operative in accordance with a preferred embodiment of the present invention. As seen in FIG. 1, the point of sale terminal may be generally similar in structure and function to a conventional point of sale terminal such as a NURIT 8100, commercially available from Verifone, Inc. It is appreciated that the present invention is not limited in its application to a given type or model of point of sale terminal but is applicable to magnetic stripe reading devices useful in any suitable point of sale device. Such a point of sale device may include, for example, a check reader, a card-based payment terminal, an electronic cash register, a PIN pad, an automatic teller machine (ATM), an automated kiosk and an electronic vending machine.

As seen in FIG. 1, the point of sale terminal preferably includes a housing 100 including a base portion 102 and a top portion 104, which are typically snap-fitted together. In the illustrated embodiment, the housing also includes a detachable and reattach able printer housing portion 106. The top portion 104 of housing 100 preferably defines a smart-card insertion slot 108, which communicates with a smart-card reader (not shown) located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118, which includes a slot 120 having spaced surfaces 122 and 124. A magnetic head assembly 130 is mounted on surface 122, typically on an inside wall of surface 122.

A printer (not shown) is disposed within printer housing portion 106 and cooperates with a roll of paper (not shown), which is supported on a paper roll holder (not shown) located within printer housing portion 106. Printed receipts 138 are output via a printer paper slot 140 defined between an edge 142 of top portion 104 and a corresponding edge 144 of a paper roll cover 146.

Disposed within housing 100 is an anti-tamper protected enclosure 150. Anti-tamper protected enclosure 150 may be constructed of rigid or flexible printed circuit elements having embedded therein electrical conductors coupled to anti-tamper detection circuitry (not shown) located within enclosure 150. Preferred embodiments of suitable anti-tamper protected enclosures are described in applicant/assignee's U.S. Pat. Nos. 6,853,093 and 6,646,565 and 6,917,299. Any other suitable type of anti-tamper protected enclosure 150 may be employed.

It is appreciated that the magnetic head assembly 130 is located outside the anti-tamper protected enclosure 150 and is coupled to decoding circuitry (not shown) located within the anti-tamper protected enclosure 150, typically by electrical conductors 152, which typically form part of a flexible flat cable 153 which are coupled to a connector 154, preferably located within the anti-tamper protected enclosure 150.

It is a particular feature of the present invention that the output signals of the magnetic head assembly 130 are supplied via electrical conductors 152 to circuitry 160 located within the anti-tamper protected enclosure 150, which constitutes a secured region. Circuitry 160 receives at least one signal output along electrical conductors 152 and includes functionality ensuring that a voltage difference along the electrical conductors 152 is virtually zero, thereby obviating illicit information retrieval via tapping of the electrical conductors 152 and analysis of voltage differences there between.

As seen in FIG. 1 and in FIG. 2, in accordance with a preferred embodiment of the present invention circuitry 160 includes current-to-voltage conversion functionality, preferably in the form of an operational amplifier 162, located within the anti-tamper protection enclosure 150. Respective negative and positive inputs A and B of operational amplifier 162 are preferably connected to a pair of electrical conductors 152 which carry signals from magnetic head assembly 130 corresponding to one track of a magnetic card swiped there past.

Input B is connected to a reference voltage, preferably, but not necessarily, ground. A resistor 163 is preferably connected between input A of the operational amplifier 162 and its output, designated C. The output of operational amplifier 162 is supplied to conventional signal processing circuitry (not shown in FIG. 2), typically including a decoder.

Preferably the resistance of feedback resistor 163 is selected such that an output signal of operational amplifier 162 has a voltage which is equal to or less than the maximum voltage employed to power the operational amplifier. This preferably is operative to reduce the effect of an increase in the output voltage from the operational amplifier 162 as a result of an increase in the swipe speed of a magnetic card (not shown) relative to magnetic head assembly 130.

In accordance with a preferred embodiment of the invention, an impedance change sensor 164 may be selectably couplable to one of conductors 152, as by a switch 166, which may be operated by suitable software. The switch 166 preferably directs the signal received along that conductor 152 to input A of the operational amplifier 162 when a card is being swiped. At a time when a card is not being swiped, such as at power up or when a card is not present at the magnetic head assembly 130, switch 166 may connect the conductor 152 to impedance change sensor 164.

Impedance change sensor 164 is operative to sense whether the impedance of conductor 152 has changed from a predetermined impedance. If a significant change of impedance has occurred, such as due to attempted illicit tapping or hacking, a suitable alarm signal may be provided to an alarm annunciator 168, which may also have a circuit disabling functionality or information erasing functionality.

It is appreciated that the circuitry of FIG. 2 is preferably separately provided for each of the pairs of conductors 152 corresponding to a track reading portion of the magnetic head assembly 130. Preferably different obscuring signals are provided for each pair of conductors. Alternatively, the circuitry of FIG. 2 may be employed for all three pairs of conductors 152.

Figure 3:
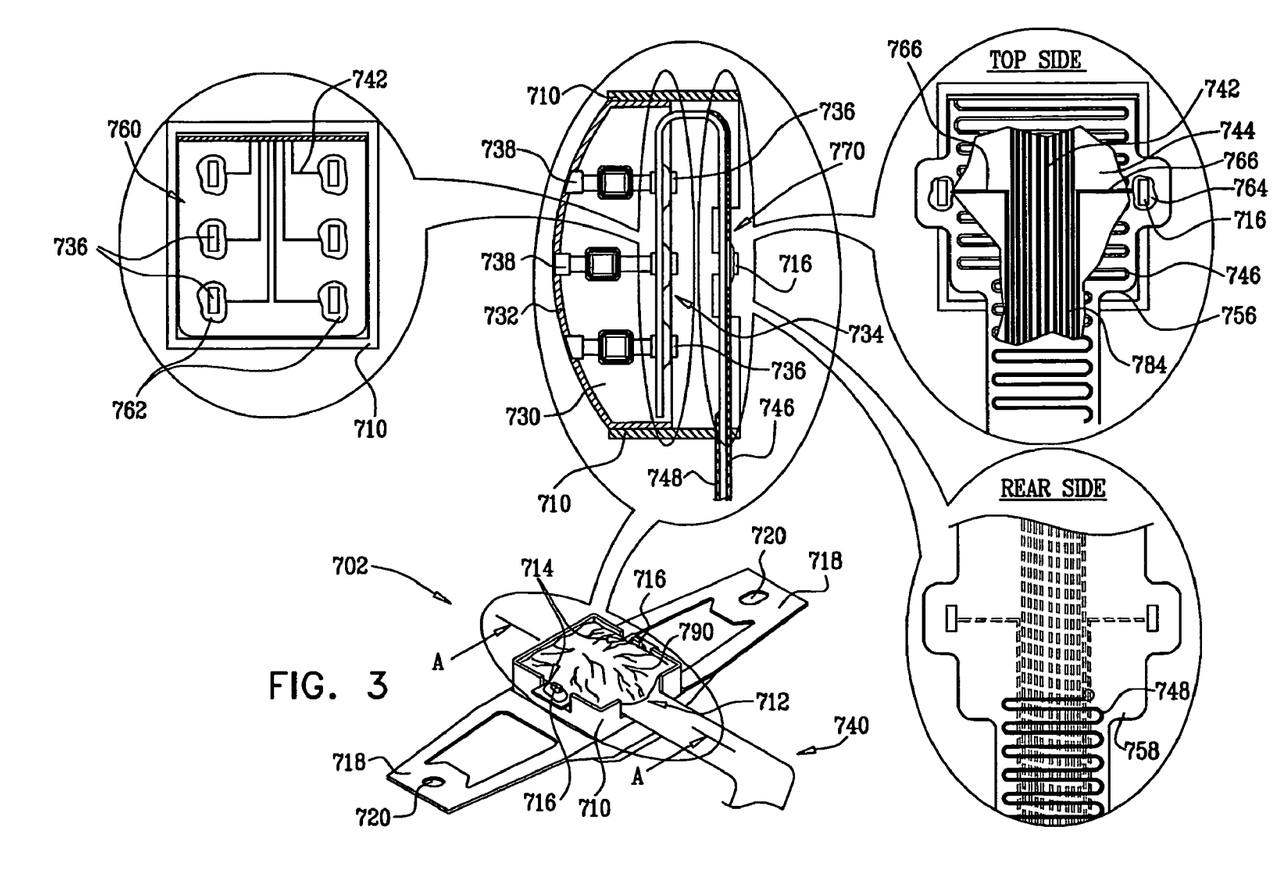
FIG. 3 is a simplified partially pictorial illustration of a magnetic head constructed and operative in accordance with a preferred embodiment of the present invention.

Reference is now made additionally to FIG. 3, which illustrates a magnetic head assembly 130 constructed and operative in accordance with a preferred embodiment of the present invention, which is useful in the magnetic card reader assembly 118. As seen in FIG. 3, the magnetic head assembly 130 preferably comprises a mounting element 702 which is typically mounted onto surface 122 of top portion 104.

Mounting element 702 is preferably formed of metal and preferably defines a peripheral enclosure 710 having an end slot 712 and two bifurcated side slots 714, each defining a ground contact 716. Extending axially sideways from the peripheral enclosure 710 are two winged, generally planar, somewhat flexible mounting portions 718 having mounting apertures 720 formed therein.

An information reading sensor 730, preferably a magnetic stripe reading sensor, such as an Apollo AP-3350B or AP-2250B, commercially available from Apollo (Zhuhai) Electronics Co., Ltd. Apollo Building, Lanpu Industrial Area E, Jiuzhou Road, Zhuhai, China 519070, is mounted within peripheral enclosure 710, such that a reading surface 732 of the sensor 730 extends outside of the enclosure 710 and the back 734 of the sensor, having electrical contacts 736 thereon, lies within the enclosure 710. Reading surface 732 includes one or more sensing regions 738 connected to contacts 736.

In accordance with a preferred embodiment of the present invention, a flat cable and connector assembly 740 is provided having a plurality of conductors 742 disposed in a conductor plane 744 and preferably having a pair of protective wire grids 746 and 748 disposed in respective planes 756 and 758 located on respective opposite sides of the conductor plane 744. The flat cable and connector assembly 740 includes a connector portion 760 preferably including plural plated-through contact apertures 762 for electrical connection to respective ones of contacts 736 and a pair of plated-through ground contact apertures 764 for electrical connection to respective ground contacts 716.

The connector portion 760 is electrically connected to electrical contacts 736, which extend through apertures 762, preferably by soldering, thereby establishing an electrical connection between the sensor 730 and at least some of conductors 742. Others of conductors 742, designated by reference numerals 766, are preferably coupled to ground by being soldered to respective ground contacts 716.

It is a particular feature of the present invention that, as seen in FIG. 3, a portion 770 of the flat cable and connector assembly 740 is arranged in a doubled-over configuration over the output contacts 736, thereby providing enhanced anti-tampering protection thereto. It is a further feature of the present invention that doubled-over portion 770 is located within the peripheral enclosure 710, which functions as an anti-tampering enclosure. Alternatively, the peripheral enclosure 710 may be eliminated and the doubled-over portion 770 is peripherally surrounded by epoxy, thus defining an alternative peripheral enclosure.

In accordance with a preferred embodiment of the present invention, as seen in FIG. 3, protective wire grid 746 extends over doubled-over portion 770. Grids 746 may be coupled to anti-tamper detection circuitry (not shown) located within anti-tamper protected enclosure 150. Additionally or alternatively, one or more of conductors 742, here designated by reference numeral 784, which are not connected to electrical contacts 736 or ground contacts 716, are also coupled to anti-tamper detection circuitry (not shown) located within anti-tamper protected enclosure 150. The anti-tamper detection circuitry (not shown) is operative to erase encryption keys or other sensitive data upon sensed tampering with grid 746 and/or conductors 784.

Additionally, in accordance with a preferred embodiment of the present invention, protective wire grid 748 extends outwardly from doubled-over portion 770 and is coupled to the anti-tamper detection circuitry (not shown), preferably located within anti-tamper protected enclosure 150 or another suitable anti-tamper protected enclosure, such as that described and claimed in assignee's U.S. Pat. No. 6,853,093. Together with grid 746, grid 748 provides anti-tamper protection to the remainder of the flat cable and connector assembly 740. Preferably a layer 790 of epoxy is provided over doubled-over portion 770 within the enclosure 710, thereby providing a mechanically sealed, tamper-protected assembly.

Various types of suitable anti-tamper detection circuitry are described in the following patent publications, the disclosures of which are hereby incorporated by reference: U.S. Pat. Nos. 5,998,858; 5,861,662 and 6,917,299.

Figure 4A:
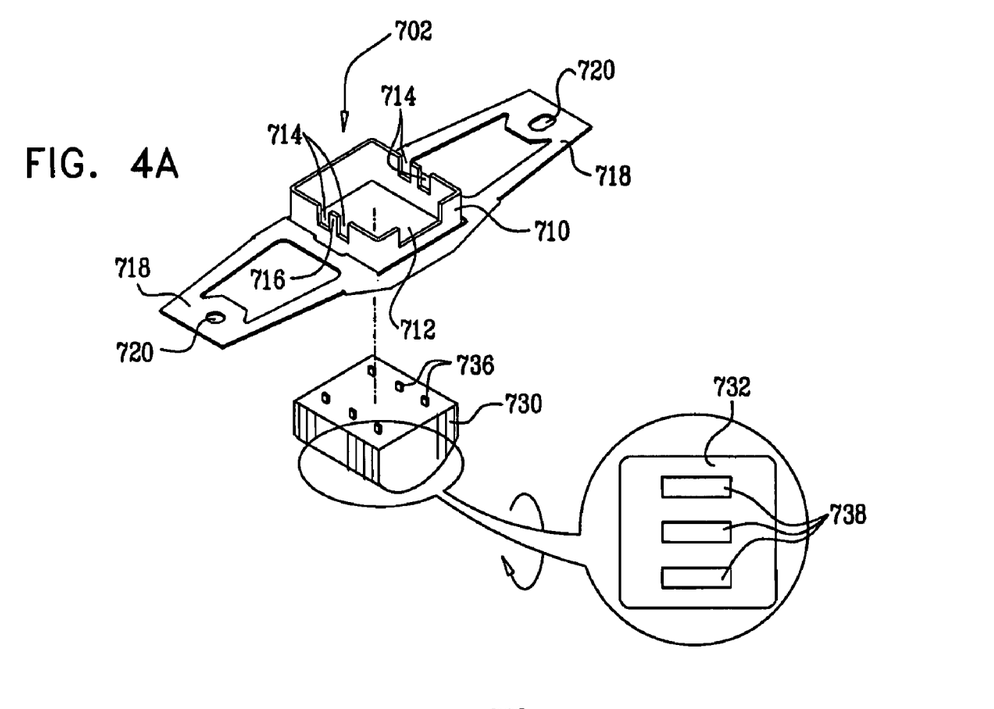
FIGS. 4A, 4B, 4C, 4D, 4E, 4F & 4G are simplified illustrations of steps in a preferred method of manufacture of the magnetic head of FIGS. 1 & 2.
Figure 4B:
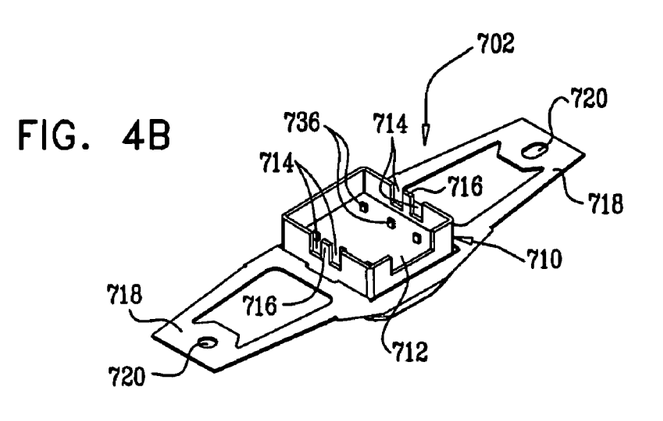
Figures 4C, 4D:
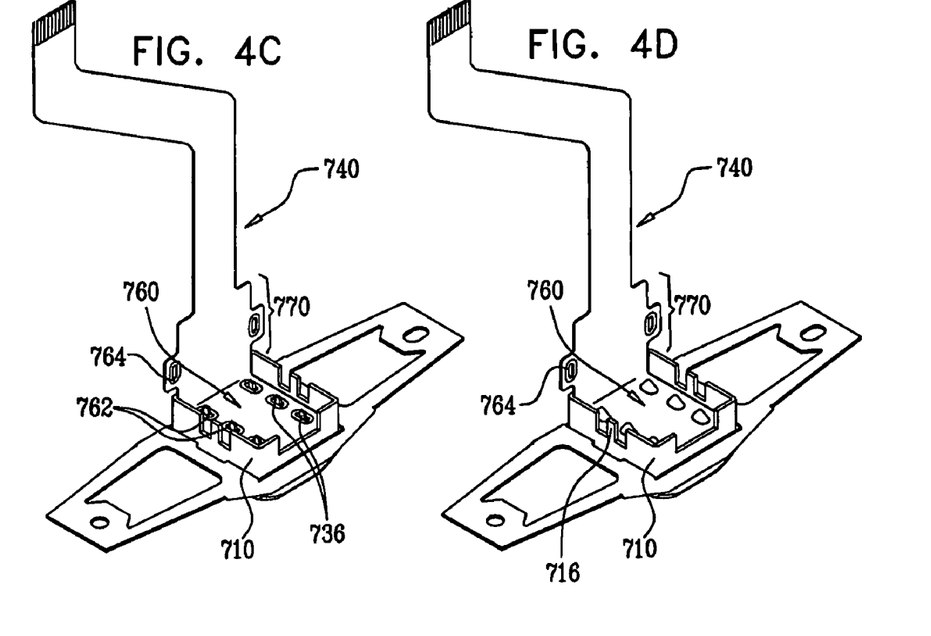

Reference is now made to FIGS. 4A-4G, which illustrate the manufacture of the magnetic head of FIGS. 1 & 3. FIGS. 4A and 4B show enclosure 710 associated with the mounting element 702. Preferably enclosure 710 is integrally formed with the mounting element 702. Alternatively it may be a separate piece which is joined to the mounting element 702. As a further alternative, it may be provided as part of sensor 730 in a customized version thereof. FIG. 4C illustrates connector portion 760 being mounted within enclosure 710 with apertures 762 engaging contacts 736. FIG. 4D shows the contacts 736 being soldered to the apertures 762.

Figure 4E:
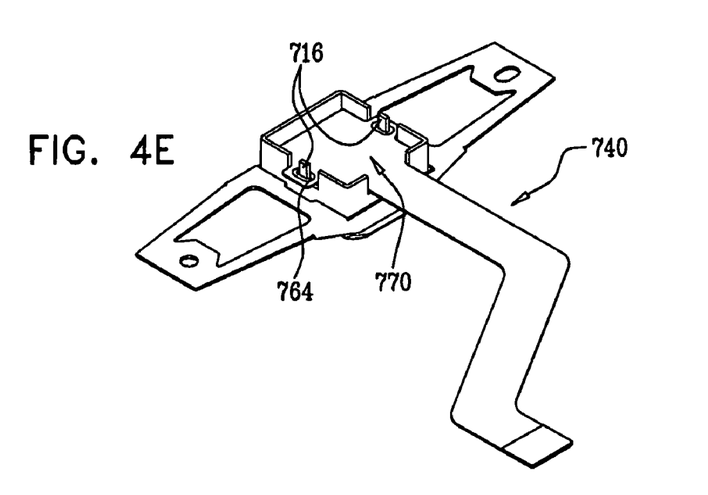
Figure 4F:
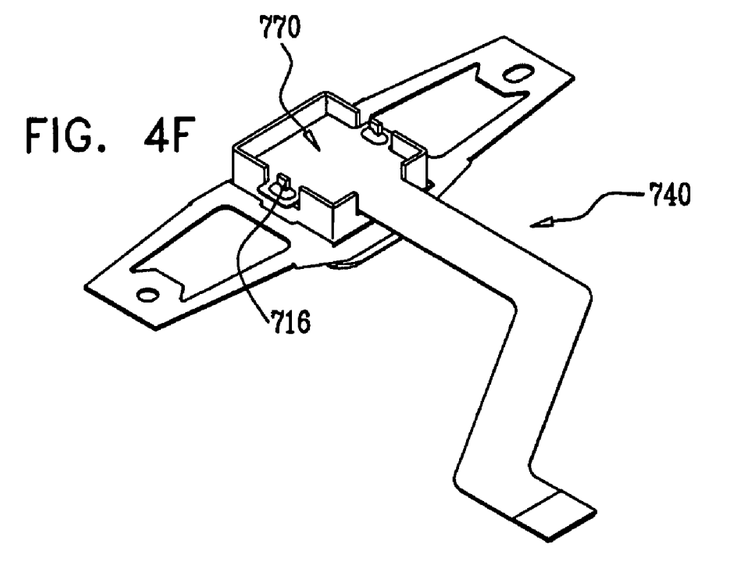
Figure 4G:
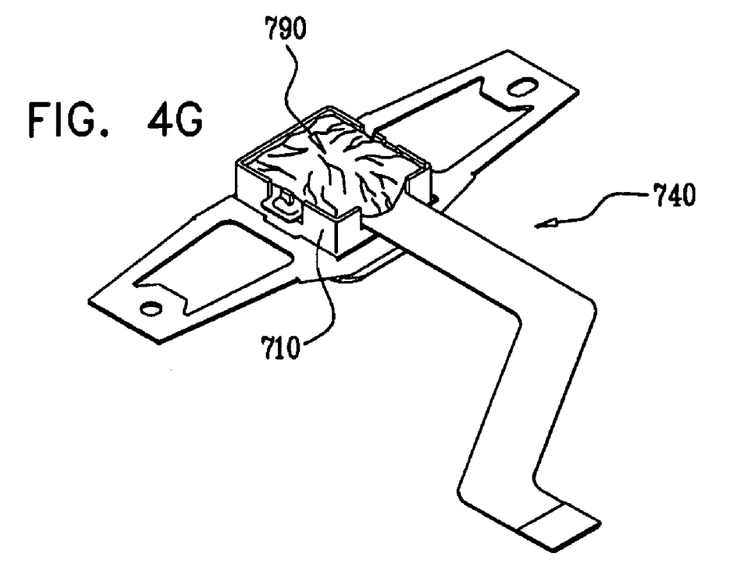

FIG. 4E shows doubled over portion 770 with apertures 764 engaging ground contacts 716. FIG. 4F shows soldering of ground contacts 716 to apertures 764. FIG. 4G shows epoxy layer 790 formed over doubled-over portion 770 and filling enclosure 710.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A magnetic card reader comprising:
    a magnetic head having at least one signal output, said magnetic head being located in a non-secured region;
    at least one signal path including at least first and second electrical conductors extending from said magnetic head in said non-secured region to a secured region and carrying said at least one signal output; and
    circuitry located within said secured region and receiving said at least one signal output along said at least one signal path, said circuitry located within said secured region including functionality ensuring that a voltage difference along said at least first and second electrical conductors is virtually zero, thereby obviating illicit information retrieval via tapping of said at least first and second conductors and analysis of voltage differences therebetween.

2. A magnetic card reader according to claim 1 and wherein said circuitry located within said secured region includes an operational amplifier having at least negative and positive inputs respectively connected to said at least first and second electrical conductors.

3. A magnetic card reader according to claim 2 and wherein said circuitry located within said secured region also includes a resistor connected between said negative input and an output of said operational amplifier.

4. A magnetic card reader according to claim 3 and wherein resistance of said resistor connected between said negative input and an output of said operational amplifier is selected such that an output signal of said operational amplifier has a voltage which is equal to or less than a maximum voltage employed to power said operational amplifier.

5. A magnetic card reader according to claim 4 and wherein said resistance of said resistor is operative to reduce an effect of an increase in the output voltage from said operational amplifier as a result of an increase in a swipe speed of a magnetic card relative to said magnetic head.

6. A magnetic card reader according to claim 1 and also comprising an impedance sensor coupled to said at least one signal path at a location within said secured region.

7. A magnetic card reader according to claim 6 and also comprising an impedance change indicator and wherein said impedance sensor provides an output indication to said impedance change indicator when a resistance or other impedance is coupled to said at least one signal path in an unauthorized manner.

8. A magnetic card reader according to claim 1 and wherein said magnetic head includes:
    a mounting element;
    at least one information reading sensor having output contacts, said sensor being mounted in said mounting element; and
    a flat cable coupled to said output contacts of said at least one information reading sensor, a portion of said flat cable being arranged in a doubled-over configuration over said output contacts, thereby to provide anti-tampering protection to said output contacts.

9. A magnetic card reader according to claim 8 and wherein said mounting element defines a peripheral anti-tampering enclosure and wherein said at least one information reading sensor and said portion of said flat cable arranged in a doubled-over configuration are located within said peripheral anti-tampering enclosure.

10. A point-of-sale device comprising:
    a housing;
    a magnetic card reader associated with the housing, said magnetic card reader comprising:

a magnetic head having at least one signal output, said magnetic head being located in a non-secured region; and at least one signal path extending from said magnetic head in said non-secured region to a secured region and carrying said at least one signal output; and circuitry located within said secured region and receiving said at least one signal output along said at least one signal path, said circuitry located within said secured region including functionality ensuring that a voltage difference along said at least first and second electrical conductors is virtually zero, thereby obviating illicit information retrieval via tapping of said at least first and second conductors and analysis of voltage differences therebetween.

11. A point of sale device according to claim 10 and wherein said circuitry located within said secured region includes an operational amplifier having at least negative and positive inputs respectively connected to said at least first and second electrical conductors.

12. A point of sale device according to claim 11 and wherein said circuitry located within said secured region also includes a resistor connected between said negative input and an output of said operational amplifier.

13. A point of sale device according to claim 12 and wherein resistance of said resistor connected between said negative input and an output of said operational amplifier is selected such that an output signal of said operational amplifier has a voltage which is equal to or less than a maximum voltage employed to power said operational amplifier.

14. A point of sale device according to claim 13 and wherein said resistance of said resistor is operative to reduce an effect of an increase in the output voltage from said operational amplifier as a result of an increase in a swipe speed of a magnetic card relative to said magnetic head.

15. A point-of-sale device according to claim 10 and also comprising an impedance sensor coupled to said at least one signal path at a location within said secured region.

16. A point-of-sale device according to claim 15 and also comprising an impedance change indicator and wherein said impedance sensor provides an output indication to said impedance change indicator when a resistance or other impedance is coupled to said at least one signal path in an unauthorized manner.

17. A point-of-sale device according to claim 10 and wherein said magnetic head includes:

a mounting element;

at least one information reading sensor having output contacts, said sensor being mounted in said mounting element; and a flat cable coupled to said output contacts of said at least one information reading sensor, a portion of said flat cable being arranged in a doubled-over configuration over said output contacts, thereby to provide anti-tampering protection to said output contacts.

18. A point-of-sale device according to claim 17 and wherein said mounting element defines a peripheral anti-tampering enclosure and wherein said at least one information reading sensor and said portion of said flat cable arranged in a doubled-over configuration are located within said peripheral anti-tampering enclosure.

* * * * *